United States Patent [19]
Bird

[11] Patent Number: 5,203,708
[45] Date of Patent: Apr. 20, 1993

[54] CREATRESS IMAGE

[76] Inventor: Nancy A. Bird, 304 W. 91st St., New York, N.Y. 10024

[21] Appl. No.: 681,117

[22] Filed: Apr. 5, 1991

[51] Int. Cl.⁵ .................................... G09B 23/28
[52] U.S. Cl. ........................................... 434/267
[58] Field of Search ............. 434/262, 267, 272, 273, 434/295; 446/304, 369, 268; D11/150, 160, 158, 157, 128, 127, 131

[56] References Cited

U.S. PATENT DOCUMENTS

| | | | |
|---|---|---|---|
| D. 85,699 | 12/1931 | Huff | D11/160 |
| 2,551,433 | 5/1951 | Graves | 434/273 |
| 4,197,670 | 4/1980 | Cox | 434/273 X |
| 4,883,442 | 11/1989 | Kaplan | 446/369 X |

OTHER PUBLICATIONS

Gadon, Elinor W., The Once and Future Goddess, pp. 115 and 29.
Walker, Barbara G., The Women's Encyclopedia of Myths and Secrets, pp. 717 and 183–187.
Stone, Merlin, When God was a Woman, pp. 7 and 219.
Sjoo, Monica and Mor, Barbara, The Great Cosmic Mother, pp. 169, 111, 224, and 92.
Woman of Power Magazine, Issue Nineteen, Winter 1991, p. 54, (Advertisement).

*Primary Examiner*—John J. Wilson
*Assistant Examiner*—Jeffrey A. Smith

[57] ABSTRACT

A multi-piece image of female creation that can be used as toy, archetypal image, educational device or therapeutic aid. The image is made up of a human-like female form together with forms which depict the nonhuman elements of creation of a particular creation myth. The female form may comprise a rigid statue, with a womb-like cavity in its abdomen, with an opening thereto between the legs of the female form. Alternatively, the female form may be a soft figure such as stuffed doll, with an expandable torso and cavity achieved e.g. by pleating or gathering. The female form may be provided with pre-made forms of the elements of the creation, or with material and instructions or patterns for these forms.

12 Claims, 5 Drawing Sheets

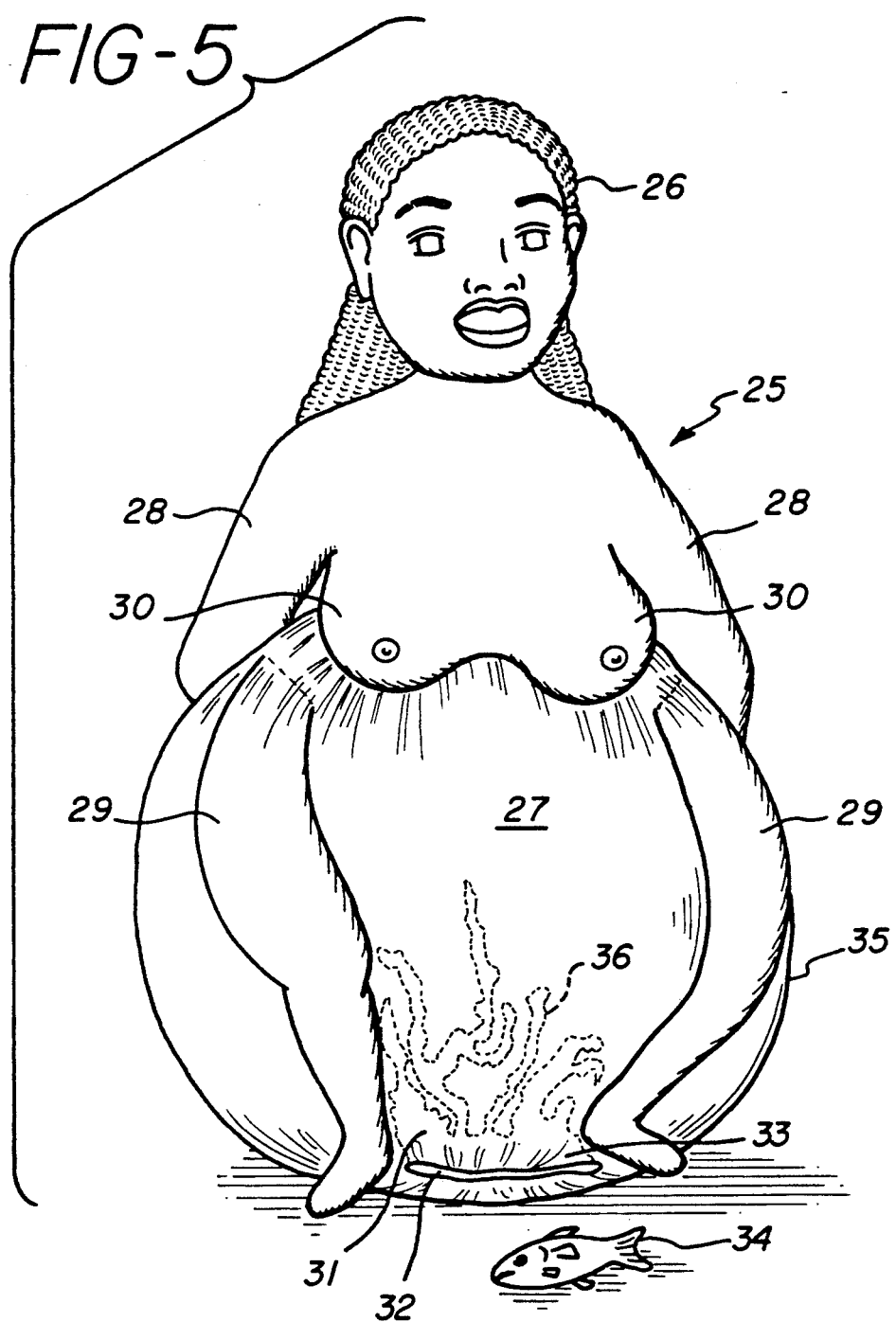

CREATRESS IMAGE

Cross-reference is made to the Co-pending Design Patent Application No. 07/681,178 to "Creatress Image", by the same inventor, filed Apr. 6, 1991, the contents of which is incorporated herein by reference.

A portion of the disclosure of this patent document contains material which is subject to copyright protection. The copyright owner has no abjection to the facsimile reproduction by anyone of the patent document or the patent disclosure, as it appears in the Patent and Trademark Office patent file or records, but otherwise reserves all copyrights whatsoever.

BACKGROUND OF THE INVENTION

The present invention is directed to a female creator image which may be used as a toy, or as an educational or therapeutic device. Numerous images of goddesses or female deities have been created and unearthed over the years; and myths or anthropological explanation attached thereto. A sampling of the images may be found in *The Great Cosmic Mother*, by Monica Sjoo and Barbara Mor, and *The Once And Future Goddess*, by Elinor W. Gadon. Some of the goddesses mentioned are female creator deities, such as Inanna, creatress of the grains and all that grows from the earth (Gadon, page 115). The creatress Nana Baluku of Eastern Europe is mentioned in *The Grandmother of Time*, by Z. Budapest, and the creation of the sun, moon, planets and earth by Kali in *The Woman's Encyclopedia of Myths and Secrets* by Barbara G. Walker, while Merlin Stone in *When God Was A Woman* tells the story of Nammu (a Sumerian creatress) who gave birth to the heavens and earth. In addition, *The Clan of the Cave Bear* and subsequent books by Auel are said to include a character "The Mother of All".

A review of the patent art revealed only U.S. Pat. Nos. 2,551,560, 4,197,670, 4,237,649 and 4,836,821. U.S. Pat. No. 2,551,560, to Graves, shows an educational device for teaching midwifery comprising a mother figure having an abdominal cavity with a front opening over which different abdominal shapes indicating different stages of gestation may be placed. The cavity is made to receive a fetus doll, and at its lower end is provided with a flexible membrane with opening to permit passage of the fetus doll. The human-like female form of the creatress image of the present invention has an expanding or exaggerated form, no front abdominal opening, no interchangeable closures for such an opening, and represents not a simulation of human birth but an impression of a creation, especially of nonhuman elements of the creation.

U.S. Pat. No. 4,197,670 discloses an educational toy simulating a mother and child. The toy is a stuffed doll having an abdominal cavity with fabric door at the front of the abdomen, and a baby doll removably carried within the cavity. The human-like female form of the present invention while anatomically closer to a human female form (in having an abdominal cavity with opening between the legs), it is associated with the "birth" of nonhuman elements of creation, not just a human baby doll.

U.S. Pat. Nos. 4,237,649 and 4,836,821 disclose apparatus for simulating a natural birthing process comprising conveyor belt and piston, respectfully. In either case, the apparatus is meant to simulate birth by the mother to an offspring of like species, not a creation.

The invention of the present application relates to the world of symbol and imagery, and hence, to play, learning and therapy. Toys serve as an objects of identification and impersonation, supposedly the basis of play. Images also serve as the "cues" in learning theory, central to Behavioral Therapy. One therapeutic use of toys or images is as the object onto which ideas and feelings may be expressed in therapeutic role play. Art Therapy focuses on the feelings expressed in the images created, and in one aspect of the present invention the user forms the elements of creation, completing the creation image.

The meanings and uses of symbols and images have long been noted in psychoanalytical theory, especially in the work on archetypes of Jung and his successors. While symbols and images generally are said to stimulate thought and influence action, archetypal images are said to operate in the unconscious, generating thoughts and actions beyond the rational mind. In a similar vein, the uses of iconograghy to create group identity, and stimulate personal transformation, have long been known. Though not intended as iconography, it is hoped the images of the present invention relate to archetypes.

Other and further objects and advantages of the invention will become apparent to those skilled in the art from a consideration of the following specification when in conjunction with the annexed drawings.

SUMMARY OF THE INVENTION

The present invention comprises an image of a female creator. The image is made up of a human-like female form and forms of the elements of a creation myth, such as the sun, moon, stars, planets, and perhaps land and sea, animals and/or plants. The forms of the elements of the creation myth fit within a womb-like cavity in the female form and can be removed therefrom through an opening between the legs of the female form. The forms of the elements of creation may be pre-made, or may be made by the user of the image; free-form, or with molds or patterns provided.

The creatress image of the present invention is a symbol or image of an awesome, life-giving, sexually potent, female deity. It may be used as a simple toy, an archetypal image, a "cue" for learning related messages, or as an object of: identification, impersonation and/or projection in therapy. It may also be used as an educational device or aid to better understand cultures reported to have had female deities and/or creatress myths, and as a teaching aid to emphasize the female aspects of the "creator" elohim in Genesis.

BRIEF DESCRIPTION OF THE DRAWINGS

FIG. 5 is a perspective view of a creatress image according to another preferred embodiment of the present invention.

DETAILED DESCRIPTION OF THE INVENTION

Figure 1:
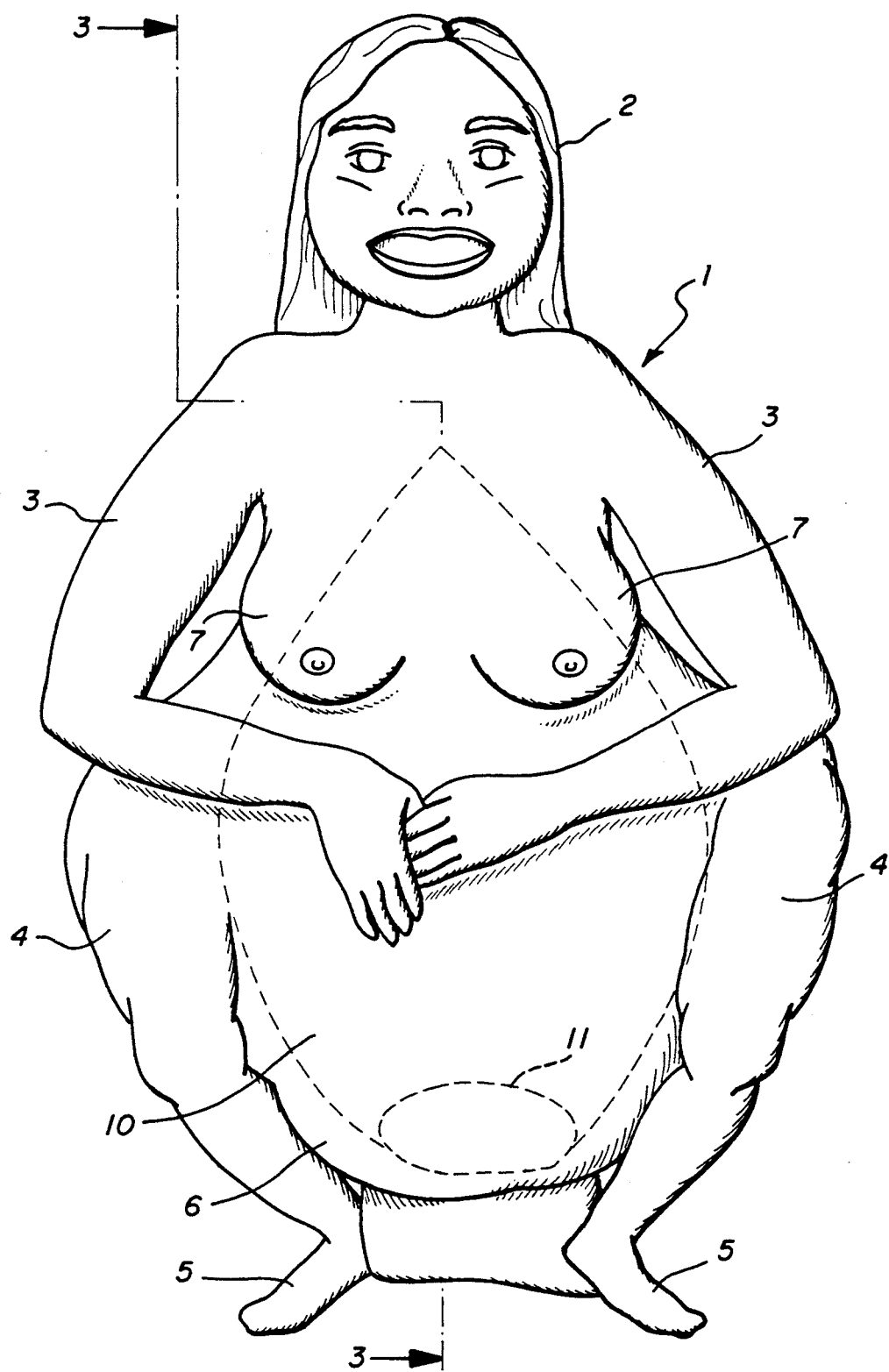
FIG. 1 is a front elevational view of a statue of an exaggeratedly pregnant human-like female form, squatting and balanced on a seat, in accordance with one embodiment of the present invention.
Figure 2:
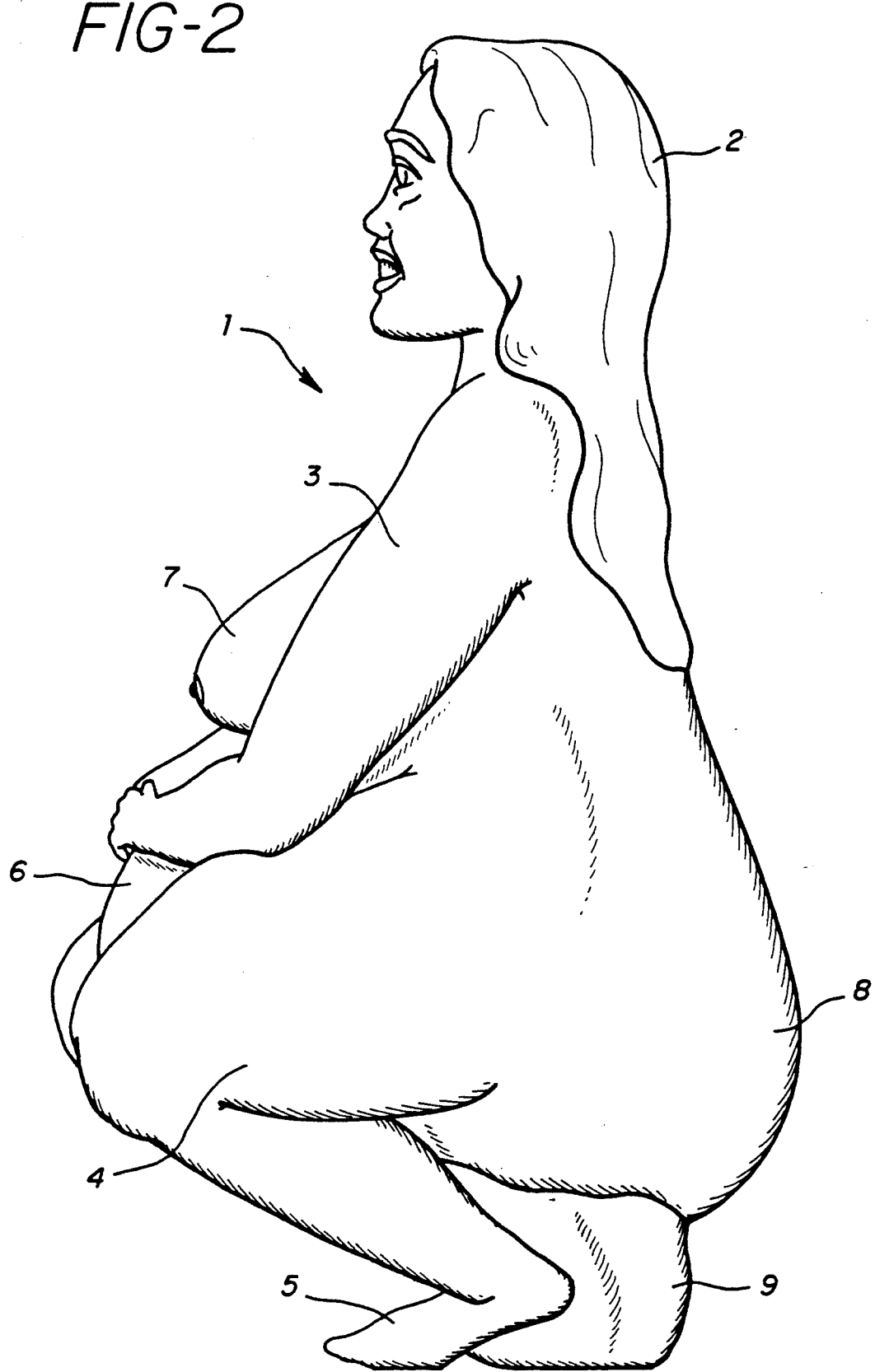
FIG. 2 is a left side elevational view of the statue of FIG. 1.
Figure 3:
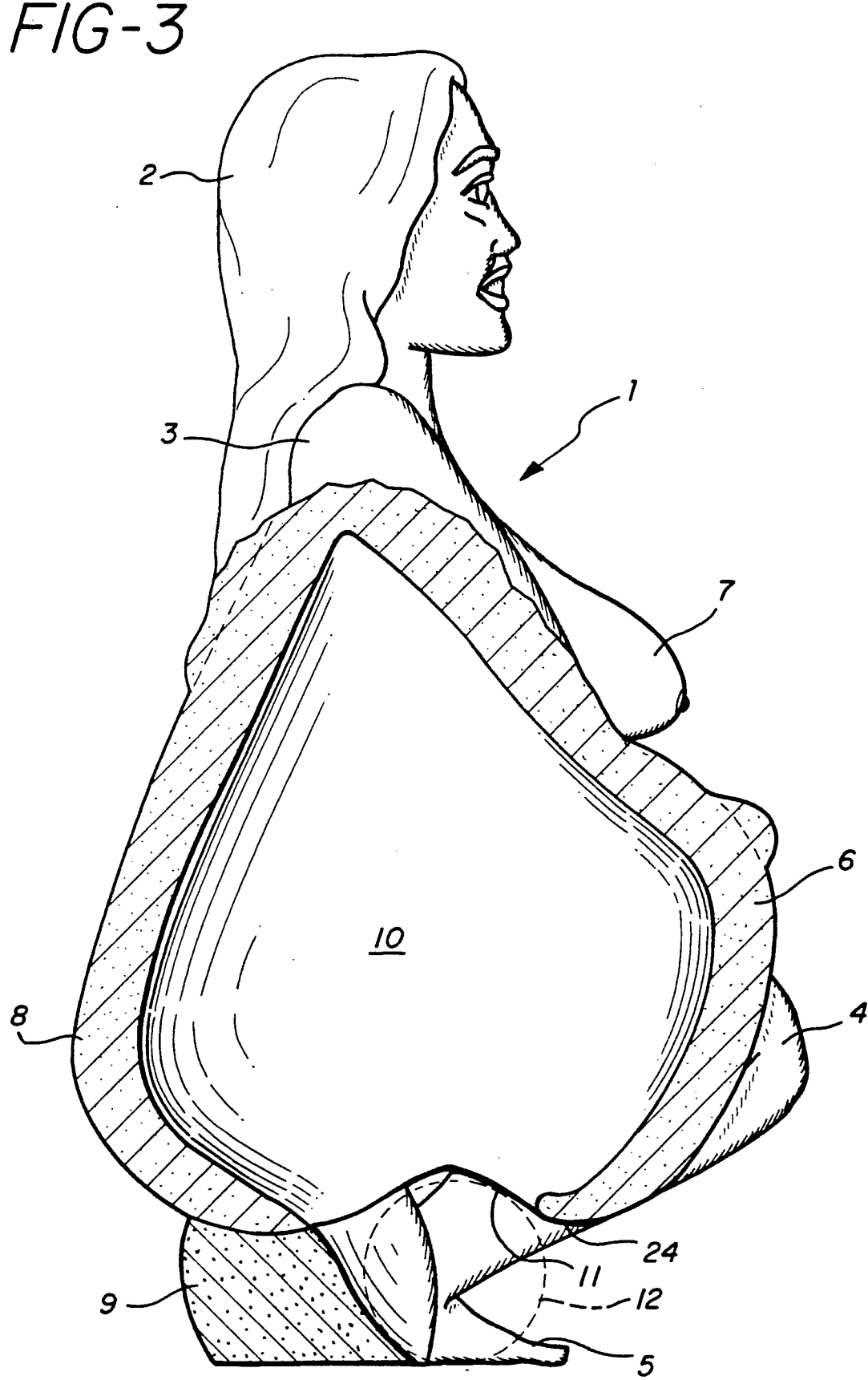
FIG. 3 is a partial cross-sectional right side view of the statue of FIG. 1, taken along line 3—3.

In one embodiment of the present, the female form and the elements of her creation are constructed of firm, fairly rigid material. In this embodiment the female form is referred to as a statue. A preferred embodiment of this construction is illustrated in FIGS. 1-3. The statue, shown in front elevation in FIG. 1, comprises a human-like female form shown generally at 1, having a head 2, and arms 3, at the upper portion thereof, and legs 4, along the lower portion thereof, and feet 5. The female form has an exaggeratedly pregnant shape evidenced by the overstated abdomen 6, breasts 7, legs 4, and backside 8, the shape of which may be more easily discerned in FIGS. 2 and 3. The female form depicted is a statue of rigid material, formed of a baked modeling compound, Sculpey, manufactured by Polyform Products, Inc. Other suitable materials would be chocolate, marzipan, air or oven dried clay, plaster, paper mache, plastic compounds that achieve substantial rigidity, traditional sculpting and molding compounds, fiberglass stone, metal, or even wicker, as the statue needs rigidity to withstand handling, not solidity. The materials may be opaque, translucent, giving it the appearance of skin, or transparent. Sculpey is paintable, most easily with acrylics, but also with water colors; and it is desireable that the female form and the forms of the elements of creation be paintable. Sculpey also tolerates being washed, and repainted, another desireable attribute for the invention.

The statue of the female form is in a squatting position, as is best seen in FIGS. 2 and 3. It is balanced on its feet 5, and a seat 9 which, as shown, is a stone but may be a chair, pillow etc. The exaggerated pregnant shape of the female form requires a secure balance to keep it from toppling and rolling, which is not desired, for at least the reason that the forms of the elements of creation may accidentally fall out and be lost. A secure balance is accomplished by the "tripod" of feet and seat. In another embodiment of the present invention, described below, made of soft, deformable material such as cloth, a secure balance is achieved by the deformation of the material, and hence the female form, as it is placed on a surface.

Images of a squatting "mother" with feet to one side (and knees to the other side) may be found in Gadon at page 29, and in Sjoo & Mor at page 111. In Gadon this is alleged to be the Neolithic birthing position, however it does not determine the posture of the creatress image, which is not a simple natural model, but a deity image, giving "birth" to the nonhuman elements of creation. The generally upright position of the creatress more closely resembles that of the Moon Goddess giving birth to the new moon, at page 169 of Sjoo & Mor.

The female form is provided with a womb-like cavity 10, shown in phantom in FIG. 1 and in cross-section in FIG. 3, with an opening 11, between the legs 4. Within the cavity may be placed, or stored, a series of forms which depict a particular creation myth. For instance, forms of a variety of flora, of the life-sustaining edible sort, such as grains, legumes, vegetables, seeds, grasses and leaves, etc. may be used to make an image of Inanna. Forms of the elements of creation of the Nammu myth might be stars, planets, earth, and perhaps things of the earth, such as plants and animals, or a sunset. As Kali is said to have formed the sun, moon, planets and earth out of her swirling blood, a piece of blood-red cloth may be included with the creatress image as Kali, and may provided with either modern or ancient diagrams of the heavens, preferably rendered in white on the red cloth. The cloth may fit within the cavity, or may be used as a wall mounting. The cloth may be completely separable from the female image, or a portion of it may be permanently attached within the cavity. In one preferred embodiment, the cloth and forms of the elements of creation all fit together within the cavity.

Figure 4:
FIG. 4 is a perspective view of a creatress image according to a preferred embodiment of the present invention.

A preferred embodiment of the creatress image of the present is illustrated in FIG. 4. The elements of the creation by elohim as set forth in Genesis are shown; namely, the sun 12, moon 13, star 14, planet 15, land 16, sea 17, flowering plant 18 and animals that swim, crawl, hop, fly, and run, namely a fish 19, snake 20, rabbit 21, bird 22, and lamb 23. The sun 12, is shown beneath the opening 11. As is more clearly illustrated in FIG. 3, with the sun 12 shown in phantom, it is preferred that the diameter of the sun is greater than the height of the lip 24 of the front of the abdomen. In this embodiment the sun can be prevented from rolling away when the image is displayed (with its "tripod" base set on a flat surface). Also, if the forms of the elements of creation are placed in the cavity and the sun either placed in last, or tucked under the abdomen as illustrated, it will keep the other forms from falling out while the image is displayed. Similar arrangements may be made for other embodiments of the creation image having different creation elements.

As illustrated these forms are only somewhat realistic. It is contemplated that they could be painstakingly realistic or quite abstract as long as they convey the image of the elements of the creation. An obvious alternative would be to depict land and sea not as separate images and forms but as a singular image or form, such as the earth.

In another embodiment of the present invention, the forms of the elements of creation are not pre-formed, and the female form provided with a description of a myth of nonhuman creation story in print, pictures and/or music, together with material for making solid forms of the elements of the creation myth. Molds of the forms of the nonhuman elements of creation, such that each form will fit through the opening, and all the forms will fit within the cavity, may be provided.

The exaggeratedly pregnant female form may also be a simple exaggeration of the realistic, or abstract. It is also within the purview of this invention that details of the female form, such as the head or arms, may be depicted as the head or wings of a bird (see pages 92 and 224 of Sjoo & Mor), or that the form have more than two arms or breasts, or even more than two legs to represent Spider Woman, a Native American creatress. The details and general approach in depicting the female form may vary so long as in overall impression the form remains human-like, and is preferably overtly sexual.

It is intended that the female form, together with the elements of her creation myth create an image that is of a deity, awesome, sexually potent and life-giving. The present invention creates a juxtaposition of these qualities with the human female form. To this end, the forms of the creation elements must include nonhuman elements. The female form may have the overall appearance of generosity and/or love as shown in attitude and gesture of its various parts, and its face may be calm, as shown in the preferred embodiment, or more strained, as that of the Moon Goddess at page 169 of Sjoo & Mor.

The image is also intended to extend sacred and revered qualities to the elements of creation, hence and depiction of them must be in accord with this intention, however, some humor would be considered natural. The image is also intended to emphasize the unity and interconnection of the creation grouping, Hence the image may convey an environmental message, and when considered appropriate, human-like forms may be included as some of the elements of creation.

In another embodiment of the present invention, shown in FIG. 5, the human-like female form shown generally at 25, comprises a soft figure. The female form has a head 26, an expandable torso 27, two arms 28, tow legs 29. The female form further comprises breasts, 30, and a womb-like cavity 31, (shown in phantom in FIG. 5) within the torso, with an opening 32, thereto at the lower portion 33, of the torso. In a more abstract embodiment, the legs might be omitted, the arms only rudimentary, and the portion of the torso underlying the breast, expandable.

The image further comprises soft forms of the elements of a creation myth, such as the fish shown at 34, each of which fit through the opening into the cavity, and all of which fit into the cavity, expanding the torso. The female form and forms of the elements of her creation may be made in accordance with the methods used generally to make soft dolls or rag dolls. The soft figure does not require a seat, but may be "seated" in the manner of soft dolls, by the deformation or rearrangement of the material of which it is made, such as readily occurs with a bean bag doll. Alternatively, the soft figure may be weighted in selected areas of the lower portion of the torso, as is also common with very light weight stuffed dolls. Lastly the soft figure may simply be laid flat, as the forms of the elements of creation will not easily fall out of the opening in this soft construction.

The exterior surface 35, of the soft figure, and the interior surface 36, of the womb-like cavity, may be made of cloth, or of cloth-like sheet material such as textured plastic sheeting. They may be decorated with a variety of objects and materials as is known in the construction of dolls, and the female form may be stuffed in the manner of a stuffed doll. In the embodiment shown in FIG. 5 the exterior surface 35, and interior surface 36, are separate sheets of material, however they may be opposed surfaces of the same sheet. The exterior sheet material in the region of the torso is expandable, as for instance by pleating or gathering, to accommodate the forms of the elements of the creation myth. If made separately, the sheet material which forms the interior surface of the cavity may also be pleated or gathered, or simply left large, as shown in FIG. 5.

As with the solid statue construction, in another embodiment of the present invention, the forms of the elements of creation are not pre-formed, and the female form provided with a description of a myth of nonhuman creation story in print, pictures and/or music, together with patterns for making soft forms of the elements of the creation myth such that each form will fit through the opening, and all the forms will fit within the cavity.

The creatress image of the present invention is a symbol or image of an unabashedly powerful, overtly sexual, female deity, and may be used as a simple toy, an archetypal image, a "cue" for learning related messages, or an object for identification, impersonation and/or projection in therapeutic role play. It may also be used as an educational device to gain better understanding of cultures which are reported to have had female deities and/or creatress myths, and as a teaching aid to emphasis the female aspects of the "creator" Elohim in Genesis.

Thus there has been illustrated and described a unique and novel creatress image, a toy, an educational device or toy, and therapeutic aid derived therefrom. It should be understood that many changes, modifications, variations and other uses and applications will become apparent to those skilled in the art after considering the specification and the accompanying drawings. Therefore, any and all such changes, modifications variations and other uses which do not depart from the spirit and scope of the invention are deemed to be covered by the invention which is limited only by the following claims.

I claim:

1. A creatress image comprising a rigid statue of an exaggeratedly pregnant human-like form with legs and feet, said human-like female form being postured in a squatting position and balanced on its feet and a seat, said statue having a cavity in the abdomen and an opening thereto between the legs, and forms of elements of creation comprising at least a sun, wherein said forms of creation elements are sized to fit within the cavity and are removeably placed within said cavity through the opening.

2. The creatress image of claim 1, wherein the forms of creation further comprise a moon, and a star.

3. The creatress image of claim 1, wherein the forms of creation further comprise, a moon, a star, a planet, and an image of land and sea.

4. The creatress image of claim 1, wherein the forms of creation further comprise, a moon, a star, a planet, an image of land and sea, and an image of animal life.

5. The creatress image of claims 1, wherein the forms of creation further comprise, a moon, a star, a planet, and images of animal and plant life.

6. The creatress image of claim 1, further comprising a piece of blood-red cloth which is removeably placed within the cavity together with the forms of elements of creation.

7. The creatress image of claim 1, further comprising a piece of blood-red cloth with a diagram of the heavens, which cloth fits within the cavity together with the forms of elements of creation.

8. A creatress image comprising a soft figure of a human-like female form comprising a head and an expandable torso, and further comprising a cavity within the torso with an opening thereto at the lower portion of the torso; and soft forms of the elements of creation comprising at least a sun, wherein each of said elements is sized to fit through the opening, and all of said elements together fit into the cavity, expanding the torso.

9. A creation image as in claim 8, further comprising a piece of blood-red cloth which fits within the cavity together with the forms of elements of creation.

10. The creatress image of claim 8, wherein the forms of creation comprise a sun, a moon, and a star.

11. A creatress image comprising a rigid statue of an exaggeratedly pregnant human-like female form with legs and feet, said human-like female form being postured in a squatting position and balanced on it's feet and a seat, said statue having a cavity in the abdomen and an opening thereto between the legs, and forms of elements of creation are sized to fit within the cavity and are removeably placed within said cavity through the opening.

12. A creatress image comprising a soft figure of a human-like female form comprising a head and an expandable torso, and further comprising a cavity within the torso with an opening thereto at the lower portion of the torso; and soft forms of the elements of creation comprising an edible plant, wherein each of said elements is sized to fit through the opening, and all of said elements together fit into the cavity, expanding the torso.

* * * * *